(12) United States Patent
Rooijakkers

(10) Patent No.: US 8,353,557 B2
(45) Date of Patent: Jan. 15, 2013

(54) MOVABLE WIND DEFLECTOR

(75) Inventor: Alphonsus Theodorus Bernardus Rooijakkers, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/129,750

(22) PCT Filed: Nov. 17, 2008

(86) PCT No.: PCT/EP2008/065640
§ 371 (c)(1),
(2), (4) Date: Jun. 13, 2011

(87) PCT Pub. No.: WO2010/054696
PCT Pub. Date: May 20, 2010

(65) Prior Publication Data
US 2011/0260505 A1    Oct. 27, 2011

(51) Int. Cl.
*B60J 7/22* (2006.01)
(52) U.S. Cl. .................................................. 296/217
(58) Field of Classification Search ............... 296/217
See application file for complete search history.

(56) References Cited

U.S. PATENT DOCUMENTS

| | | | | |
|---|---|---|---|---|
| 4,362,332 | A * | 12/1982 | Garnham | 296/217 |
| 4,619,480 | A * | 10/1986 | Motoyama et al. | 296/217 |
| 4,630,860 | A * | 12/1986 | Fuerst et al. | 296/217 |
| 5,601,330 | A * | 2/1997 | Ulbrich et al. | 296/217 |
| 5,833,305 | A * | 11/1998 | Watzlawick et al. | 296/217 |
| 6,082,812 | A * | 7/2000 | Lenkens et al. | 296/214 |
| 6,174,025 | B1 * | 1/2001 | Henderson et al. | 296/217 |
| 6,648,406 | B2 * | 11/2003 | Dittrich et al. | 296/217 |
| 2002/0117876 | A1 | 8/2002 | Sakai | |

FOREIGN PATENT DOCUMENTS

| | | |
|---|---|---|
| DE | 10046455 C1 | 4/2002 |
| DE | 10248864 * | 2/2004 |
| DE | 102007053079 B3 | 10/2008 |
| EP | 0903253 A1 | 9/1998 |
| EP | 1745965 A2 | 1/2007 |
| JP | 11165538 A | 6/1999 |
| NL | 1007488 C1 | 3/1999 |

OTHER PUBLICATIONS

European Search Report of the European Patent Office Patent Office in counterpart foreign application No. PCT/EP2008/065640 filed Nov. 17, 2008.
Written Opinion of the European Patent Office Patent Office in counterpart foreign application No. PCT/EP2008/065640 filed Nov. 17, 2008.

* cited by examiner

*Primary Examiner* — Dennis Pedder
(74) *Attorney, Agent, or Firm* — Steven M. Koehler; Westman, Champlin & Kelly, P.A.

(57) ABSTRACT

A movable wind deflector assembly for use in an open roof construction for a vehicle comprises at least one pivoting wind deflector arm that with a first end is pivotally connected to the vehicle at a hinge point and at its opposite second end carries a wind deflector body extending in a transverse direction with respect to the longitudinal axis of the vehicle. The wind deflector assembly further comprises an operating mechanism for moving the wind deflector arm and wind deflector body forward in the longitudinal direction of the vehicle.

20 Claims, 6 Drawing Sheets

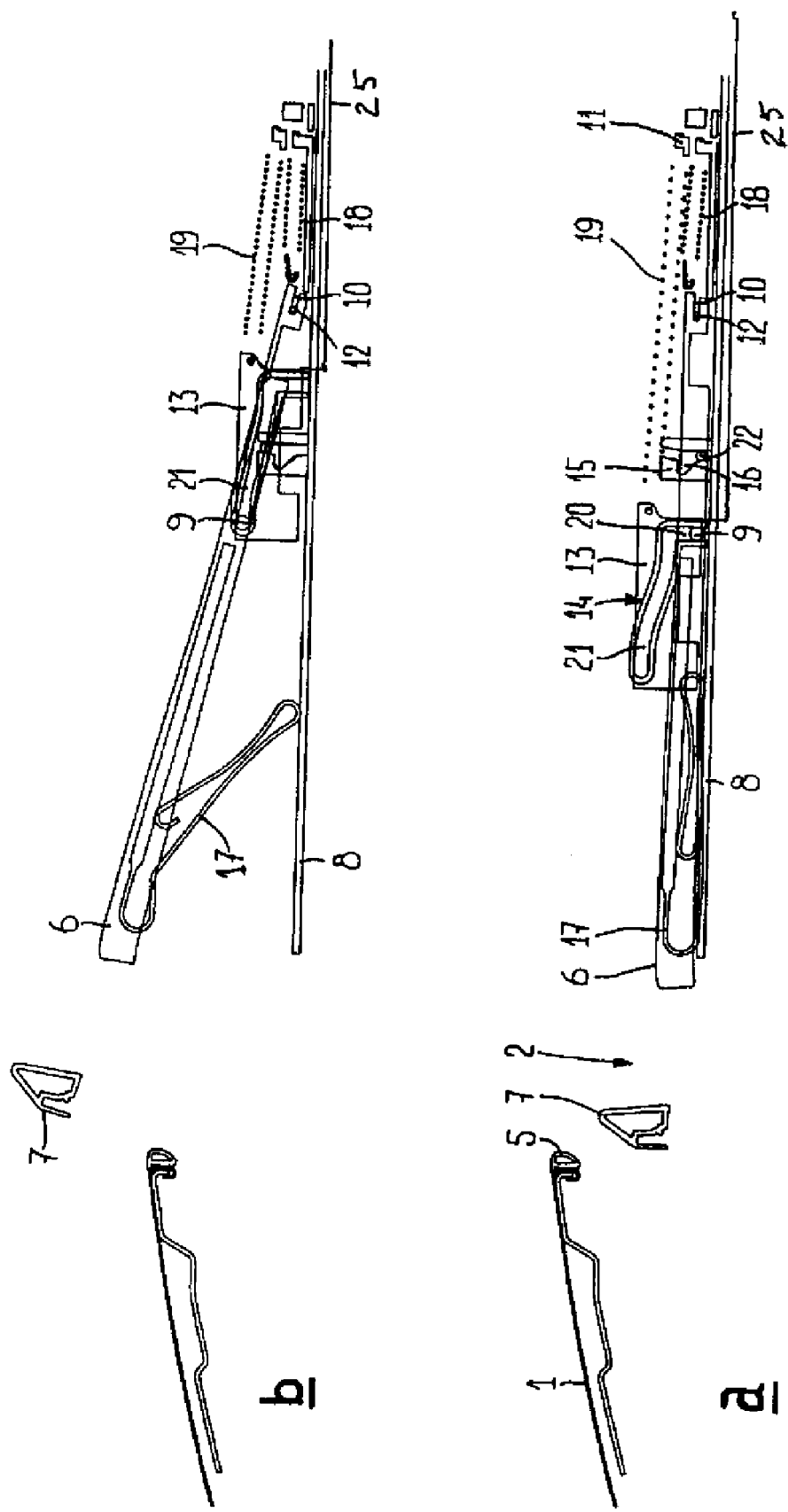

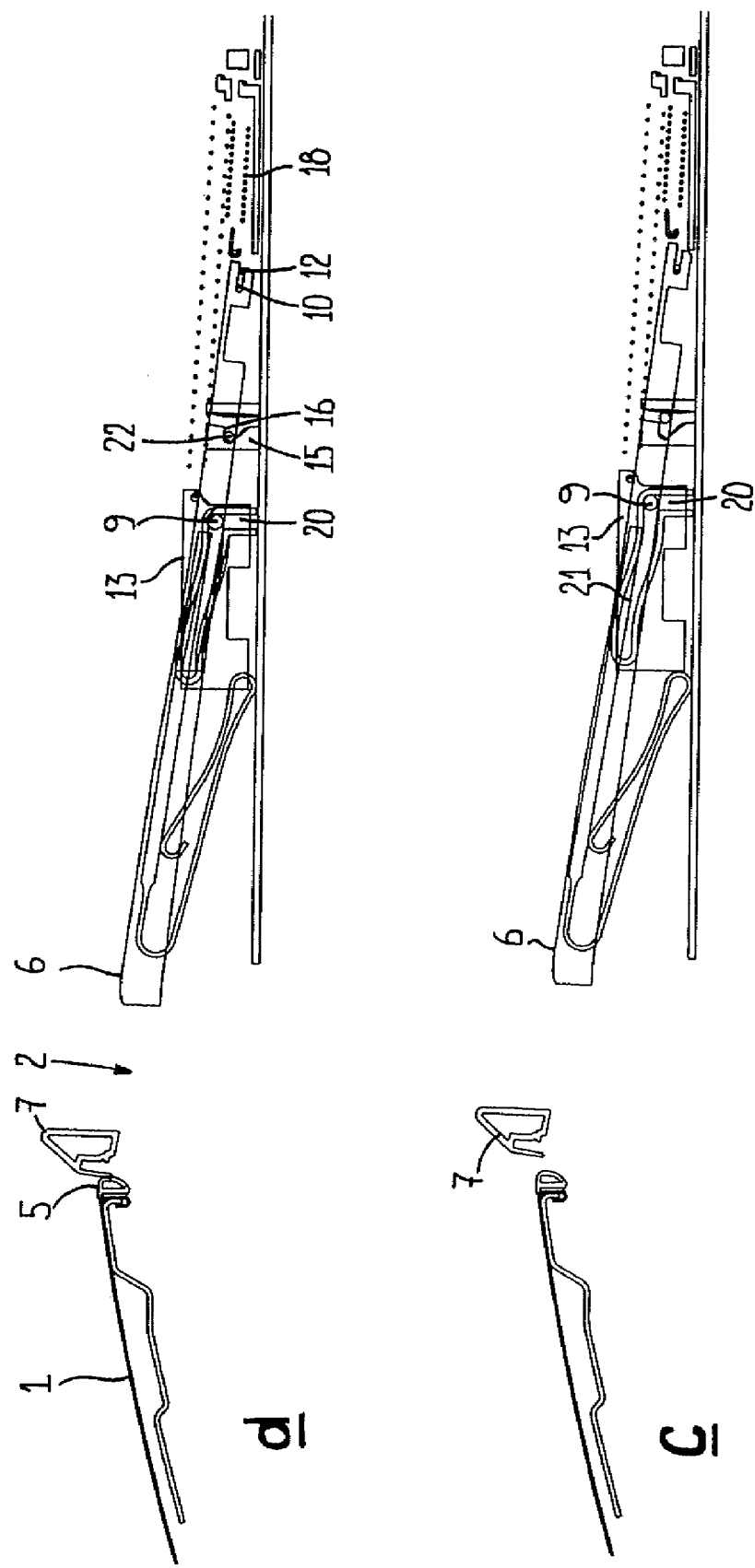

MOVABLE WIND DEFLECTOR

CROSS-REFERENCE TO RELATED APPLICATION

This application is a Section 371 National Stage Application of International Application PCT/EP2008/065640 filed Nov. 17, 2008 and published as WO/2010/054696 in English.

BACKGROUND

The discussion below is merely provided for general background information and is not intended to be used as an aid in determining the scope of the claimed subject matter.

An aspect of the invention relates to a movable wind deflector assembly for use in an open roof construction for a vehicle, comprising at least one pivoting wind deflector arm that with a first end is pivotally connected to the vehicle at a hinge point and at its opposite second end carries a wind deflector body extending in a transverse direction with respect to the longitudinal axis of the vehicle.

In a known movable wind deflector assembly in which the wind deflector arm pivots around said hinge point such a pivoting causes the creation of a gap between the wind deflector body and a forward edge of a roof opening of the open roof construction. In many instances such a gap causes disturbing wind noises. As such, the geometry of such a known movable wind deflector assembly is far from optimal aerodynamically.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention includes a movable wind deflector assembly having a wind deflector assembly that further comprises an operating mechanism for moving the wind deflector arm and wind deflector body forward in the longitudinal direction of the vehicle.

As a result the wind deflector body can be positioned in a position which offers the optimal aerodynamic characteristics. Specifically the gap between the wind deflector body and forward edge of the roof opening can be minimized.

The following should be noted. Although the invention is described in terms of a forward movement of the wind deflector arm and wind deflector body, the scope of the invention likewise extends to a rearward movement with respective mirror image construction or movement of relevant parts of the wind deflector assembly. Further it is noted that relative terms such as 'forward', 'transverse', 'vertically', 'lower' and 'higher' are defined with respect to the (normal orientation of the) vehicle.

It is possible that for allowing the movement of the wind deflector in said longitudinal direction the hinge point is movable in said longitudinal direction.

Such a movable hinge point may be realized in different ways. For example the hinge point may be defined by a hinge pin and an elongate slot movably receiving said hinge pin.

Then, in one embodiment, said hinge pin has a stationary position with respect to the vehicle and the elongate slot is defined in the wind deflector arm. It will be clear, however, that the hinge pin also may be part of the wind deflector arm whereas the elongate slot is fixedly connected to the remainder of the vehicle.

According to one embodiment, the movable wind deflector assembly comprises a movable curve and a guide pin extending from the wind deflector arm which cooperate for at least partially causing the pivot movement of the wind deflector arm, wherein said curve comprises a substantially vertically extending first curve part housing said guide pin when the wind deflector arm is in a retracted, lower position and an inclined second curve part housing said guide pin when the wind deflector arm is in an extended, higher position, and wherein a movement of the movable curve is used too for causing the forward movement of the wind deflector arm and wind deflector body in the longitudinal direction of the vehicle.

In this embodiment the movable curve serves two functions: firstly causing at least part of the standard pivoting motion of the wind deflector arm through the cooperation between the curve parts and the guide pin, and secondly causing the desired forward movement of the wind deflector arm and wind deflector body.

In such an embodiment of the movable wind deflector assembly it is possible that the inclined second curve part extends in the said forward direction from its junction with the vertically extending first curve part, and wherein said forward movement of the wind deflector arm and wind deflector body is caused by a corresponding forward movement of the movable curve when the guide pin is in a position in said vertically extending first curve part.

This embodiment allows the longitudinal forward movement of the wind deflector arm and wind deflector body when the guide pin is in the vertically extending first curve part, thus when the wind deflector body is not yet in its fully extended position. Such a position of the wind deflector may correspond with a high speed position (position at high speed of the vehicle).

Additionally it is possible then that the wind deflector arm is provided with a locking pin which in the forwardly moved position of the wind deflector arm and wind deflector body enters a substantially vertically extending stationary locking slot. Such a locking pin may improve the retention and definition of the pivot position of the wind deflector arm.

However, according to an alternative embodiment of the movable wind deflector assembly the inclined second curve part extends opposite to said forward direction from its junction with the vertically extending first curve part, and wherein said forward movement of the wind deflector arm and wind deflector body is caused by a corresponding forward movement of the movable curve when the guide pin is in a position at the end of said inclined second curve part facing away from said junction.

This embodiment allows the longitudinal forward movement of the wind deflector arm and wind deflector body when the guide pin is at the end of the inclined second curve part, thus when the wind deflector body is in its fully extended position. Such a position of the wind deflector may correspond with a low speed position (position at low speed of the vehicle).

In yet another embodiment the movable curve is spring loaded in the direction opposite to said forward direction and a push member is provided for moving the movable curve in said forward direction.

Such a push member only is able to force the movable curve into the forward direction. The return (rearward) motion is caused by the spring load (for example caused by a tension spring).

For example said push member may be a push and pull cable used to operate parts of the open roof construction, which then serves the additional function of operating the movable curve.

When, in accordance with another embodiment of the movable wind deflector assembly the wind deflector arm is spring loaded in the direction opposite to said forward direction, the correct position at the hinge point is safeguarded.

Further the wind deflector arm may be spring loaded to an extended, high position. Such an embodiment may be combined with, for example, a movable panel for opening and closing the roof opening. In a closed position of the panel it may engage the wind deflector for keeping it in a lower position. When the panel is moved towards its open position the wind deflector arm automatically will start to pivot for lifting the wind deflector body. This movement then may be followed by a movement of a movable curve for further lifting the wind deflector body.

BRIEF DESCRIPTION OF THE DRAWINGS

Hereinafter aspects of the invention will be elucidated while referring to the drawing, in which:

FIG. 3 schematically illustrates the operation of a first embodiment of the wind deflector assembly in four different stages, and FIG. 4 schematically illustrates the operation of a second embodiment of the wind deflector assembly in four different stages.

DETAILED DESCRIPTION OF THE ILLUSTRATIVE EMBODIMENTS

Figure 1:
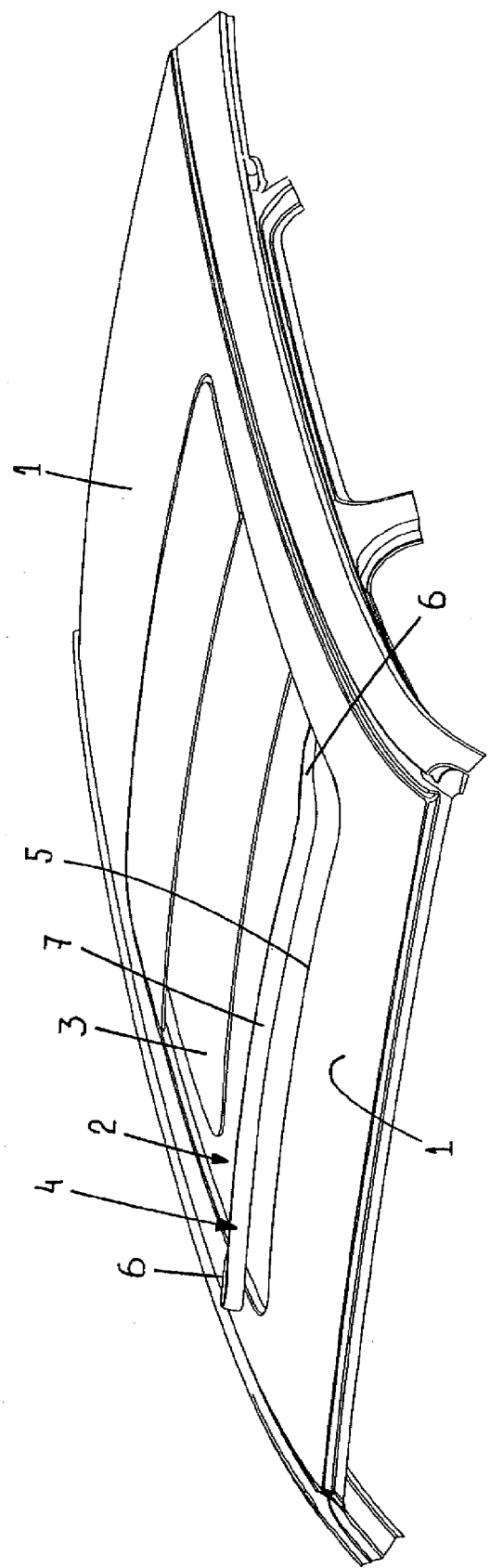
FIG. 1 shows part of a vehicle roof with a roof opening in which a wind deflector assembly is provided.

Referring to FIG. 1 part of the roof of a vehicle is illustrated (of which the forward side is at the left of the drawing), with a stationary roof part 1, a roof opening 2, a movable panel 3 for selectively opening and closing the roof opening 2 and a wind deflector assembly 4 positioned near a forward edge 5 of the roof opening 2.

The movement of the panel 3 may occur manually or by a moving mechanism as is known from the state of the art with respect to open roof constructions. As will appear later, the panel 3 can cooperate with the wind deflector assembly in such a manner that the latter is kept in a lower position when former is in its closed position (abutting forward edge 5). This also is a known principle on the field of open roof constructions and, therefore, needs no further explanation.

The wind deflector assembly 4 comprises two wind deflector arms 6 which with a first end are pivotally connected to the remainder of the vehicle. Between the opposite second ends of the wind deflector arms 6 a wind deflector body 7 extends which aerodynamically defines the basic effective part of the wind deflector assembly.

The wind deflector assembly 4 can pivot between a position in which the wind deflector arms 6 and wind deflector body 7 are positioned below the outer contour of the stationary roof part 1, and an extended position at a higher level (e.g. as indicated in FIG. 1) in which the wind deflector body 7 is positioned above the stationary roof part 1 and may influence the air flow above the roof opening 2. This also is known from the state of the art.

Figure 2:
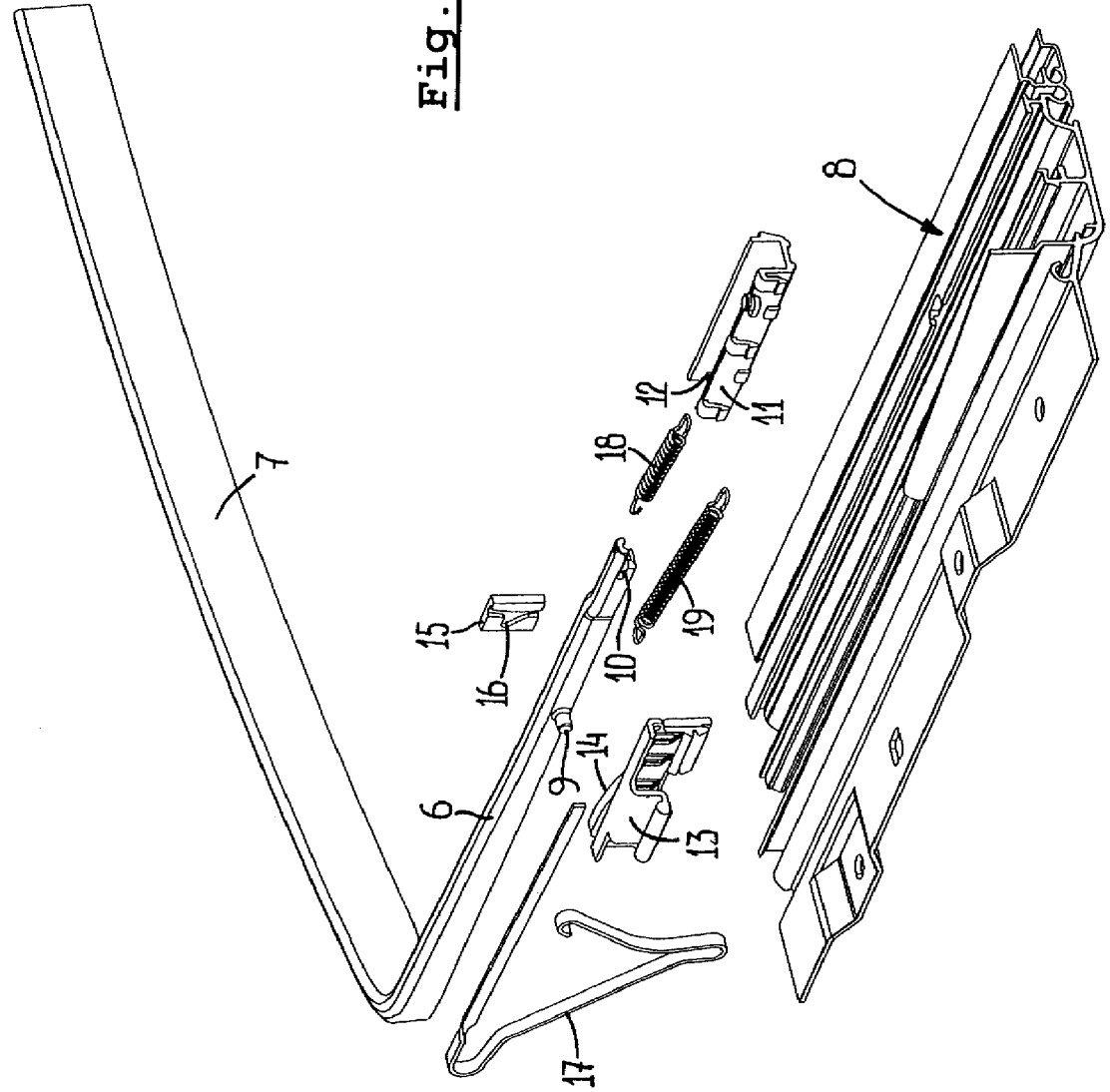
FIG. 2 illustrates a wind deflector assembly in disassembled state.

FIG. 2 shows part of an embodiment of the wind deflector assembly with the constitutive parts disassembled. The following parts are visible: one of the wind deflector arms 6, the wind deflector body 7, a guide assembly 8, a guide pin 9 attacked to the wind deflector arm 6, an elongate hinge slot 10 at the free end of the wind deflector arm 6, a hinge part 11 defining a hinge pin 12 for cooperation with the hinge slot 10, a curve member 13 provided with a curve 14 for cooperation with the guide pin 9, a locking part 15 provided with a locking slot 16 and first, second and third spring members 17, 18 and 19 respectively.

Figure 4:
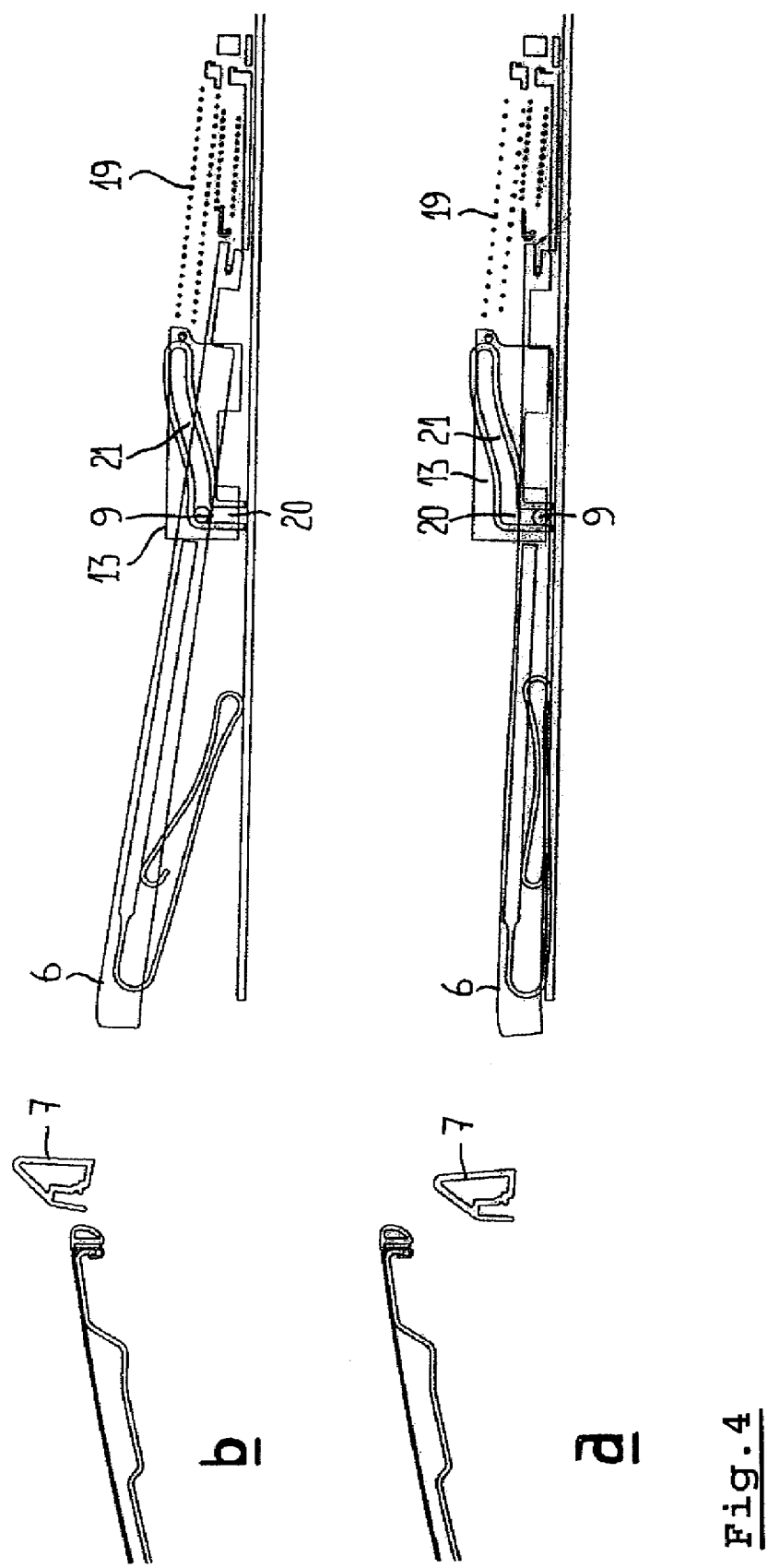
Figure 4:
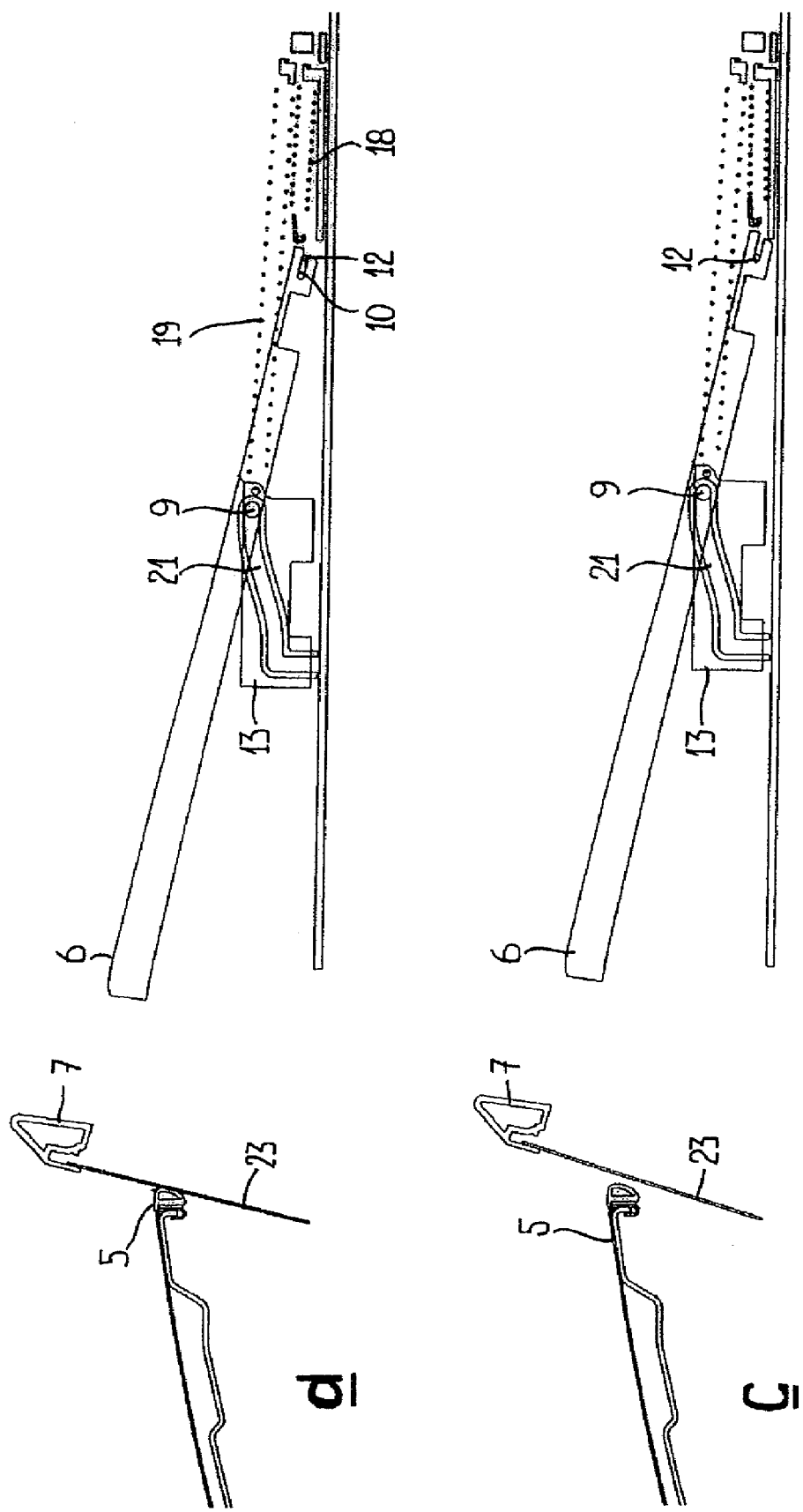

Although details about the position and function of these parts will become clear from the description of two embodiments of the movable wind deflector assembly shown in FIGS. 3 and 4, the following may be noted in general. The guide assembly 8 is connected to the stationary roof part 1 of the vehicle and defines, among others, a track for the movement of the curve member 13. The hinge part 11 and locking part 15 likewise are positioned stationary. The first spring member 17 operates between the wind deflector arm 6 and a stationary vehicle part. The second spring member 18 preloads the hinge pin 12 into the hinge slot 10 and the third spring member 19 preloads the curve member 13.

Next, reference is made to FIG. 3, showing a first embodiment of a movable wind deflector assembly in four different stages. It is noted that FIG. 3 (as well as FIG. 4) shows only in a schematic manner side elevational views (for example, the physical connection between the wind deflector arm 6 and wind deflector body 7 has not been illustrated) showing the functional cooperation between parts.

FIG. 3a is a position in which the wind deflector assembly 4 is in a retracted, low position. The first spring member 17 is in a compressed state. The wind deflector arm 6 is kept low by the panel 3 (FIG. 1) positioned above it.

The curve 14 of the curve member 13 has a vertically extending first curve part 20 and an inclined second curve part 21 extending in a forward direction (in FIG. 3 to the left) of the vehicle. In FIG. 3a the guide pin 9 of the wind deflector arm 6 is positioned in the first curve part 20.

When the panel 3 moves to an open position (to the right in FIG. 3) the first spring member 17 pivots the wind deflector arm 6 upwards around hinge pin 12. Second spring member 18 keeps the hinge pin 12 loaded against the left, inner end of the hinge slot 10. Guide pin 9 moves upwardly in first curve part 20. Upon reaching the junction with the second curve part 21, a movement of the curve member 13 to the right along guide assembly 8 leads to a movement of the guide pin 9 into the second curve part 21, and the position according to FIG. 3b is reached. In his position the wind deflector is fully extended.

The movement of the curve member 13 here basically occurs through the third spring member 19. A reverse movement (to the left) of the curve member 13 may be realized by a push member 25 (schematically illustrated in FIGS. 3a and 3b) adapted to move the curve member 13 against the preload of the third spring member 19. Such a push member may be a push/pull cable which also is used for operating other parts of the open roof assembly.

When, starting from the position in FIG. 3b, the curve member 13 is moved to the left, the second curve part 21 urges the guide pin 9 (and thus the wind deflector arm 6 and wind deflector body 7) to the position illustrated in FIG. 3c, in which the guide pin 9 has just reached the first curve part 20. In this position the wind deflector arm 6 again may be pushed down (by the panel 3) while guide pin 9 travels down in first curve part 20.

However, starting from the position in FIG. 3c it is possible too to move curve member 13 further forward (to the left) such that the vertically extending first curve part 20 moves guide pin 9, and thus wind deflector arm 6 with wind deflector body 7, to the left. Such a forward movement of the wind deflector arm is allowed by the hinge slot 10 sliding relative to the stationary hinge pin 12 against the preload of the second spring member 18.

As a result the position according to FIG. 3d may be reached, in which the wind deflector body 7 contacts (or has approached) the forward edge 5 of the roof opening 2. A locking pin 22 attached to the wind deflector arm 6 has entered the substantially vertically extending locking slot 16 of the locking part 15.

In the embodiment according to FIG. 3 the forward movement of the wind deflector occurs when the guide pin 9 is in the first curve part 20, thus when the wind deflector is not fully extended.

The embodiment according to FIG. 4 functions mainly in a corresponding manner. However, in this embodiment the second inclined curve part 21 extends rearward from its junction with the first curve part 20. As a result, for reaching the fully lifted position of the wind deflector (FIG. 4c) the curve member 13 has to be moved forward against the preload of the third spring member 19. Further, moving the wind deflector forward towards the forward edge 5 (FIG. 4d) of the roof opening now is possible only when the guide pin 9 is located at the extreme (right) end of the second curve part 21 (see FIG. 4c), that is when the wind deflector is at its fully deflected, high position, such that moving the curve member 13 in this situation to the left (forward) will urge the guide pin 9 (and, consequently, the wind deflector arm 6 with attached wind deflector body 7) to the left. Such a forward movement of the wind deflector may be advantageous when it is provided with a flexible and air permeable mesh material 23 connected to a stationary part of the vehicle. The forward movement may bring this mesh material 23 into engagement with the said forward edge 5 of the roof opening.

The invention is not limited to the embodiments described before which may be varied in many ways within the scope of the invention as defined by the appending claims.

The invention claimed is:

1. A movable wind deflector assembly for use in an open roof construction for a vehicle, comprising:
at least one pivoting wind deflector arm having a first end pivotally connectable to the vehicle through a hinge assembly defining a hinge point and a second end carrying a wind deflector body extending in a transverse direction with respect to a longitudinal axis of the vehicle, the hinge assembly including a hinge pin mounted in a stationary position with respect to the vehicle and an elongate slot provided on the wind deflector arm receiving the hinge pin;
an operating mechanism configured to move the wind deflector arm and wind deflector body in a forward direction relative to the longitudinal axis of the vehicle, the operating mechanism comprising a movable curve and a guide pin extending from the wind deflector arm which cooperate for at least partially imparting pivoting movement to the wind deflector arm, wherein said curve comprises a substantially vertically extending first curve part housing said guide pin when the wind deflector arm is in a retracted, lower position and an inclined second curve part housing said guide pin when the wind deflector arm is in an extended, higher position, and wherein movement of the movable curve is configured to impart a forward movement to the wind deflector arm and the wind deflector body in the forward direction relative to the longitudinal axis of the vehicle.

2. The movable wind deflector assembly according to claim 1, wherein the inclined second curve part extends in the forward direction from its junction with the vertically extending first curve part, and wherein said forward movement of the wind deflector arm and wind deflector body is imparted to the wind deflector arm by forward movement of the movable curve when the guide pin is in a position in said vertically extending first curve part.

3. The movable wind deflector assembly according to claim 2, wherein the wind deflector arm is provided with a locking pin which in a forwardly moved position of the wind deflector arm and the wind deflector body enters a substantially vertically extending stationary locking slot.

4. The movable wind deflector assembly according to claim 1, wherein the inclined second curve part extends in a direction opposite to said forward direction from its junction with the vertically extending first curve part, and wherein said forward movement of the wind deflector arm and the wind deflector body is imparted by forward movement of the movable curve when the guide pin is in a position at an end of said inclined second curve part spaced from said junction.

5. The movable wind deflector assembly according to claim 1, and further comprising a spring and a push member connected to the movable curve, wherein the movable curve is spring loaded in a direction opposite to said forward direction and wherein the push member is configured to move the movable curve in said forward direction.

6. The movable wind deflector assembly according to claim 5, wherein said push member is a push and pull cable.

7. The movable wind deflector assembly according to claim 1 and further comprising a spring connected to the wind deflector arm, wherein the wind deflector arm is spring loaded in a direction opposite to the forward direction.

8. The movable wind deflector assembly according to claim 1 and further comprising a spring operably connected to the wind deflector arm to spring load the wind deflector arm to the extended, higher position.

9. The movable wind deflector assembly according to claim 1 and further comprising two wind deflector arms attached to opposite ends of the wind deflector body.

10. The movable wind deflector assembly according to claim 1 and further comprising a flexible and air permeable mesh material connected to the wind deflector body.

11. A movable wind deflector assembly for use in an open roof construction for a vehicle, comprising:
at least one pivotal wind deflector arm having a first end pivotally connectable to the vehicle through a hinge assembly defining a hinge point and a second end carrying a wind deflector body extending in a transverse direction with respect to an elongated length of the wind deflector arm, the elongated length extending from the second end to the first end; and
an operating mechanism comprising a movable curve and a guide pin extending from the wind deflector arm and movable along the movable curve to at least partially impart pivotal movement to the wind deflector arm and to move the wind deflector arm and wind deflector body in a forward direction relative to a longitudinal direction of the vehicle, wherein the movable curve includes a substantially vertically extending first curve part housing the guide pin when the wind deflector arm is in a retracted, lower position, and an inclined second curve part housing said guide pin when the wind deflector arm is in an extended higher position and wherein movement of the movable curve is configured to impart a forward movement to the wind deflector arm and the wind deflector body in the forward direction.

12. The movable wind deflector assembly of claim 11 wherein the hinge assembly includes a stationary hinge pin coupled to the vehicle and movable along a slot on the wind deflector arm wherein the forward movement of the wind deflector arm moves the wind deflector arm in a direction away from the stationary hinge pin.

13. The movable wind deflector assembly of claim 12 wherein the stationary hinge pin is preloaded by a spring toward an end of the slot on the wind deflector arm.

14. The movable wind deflector assembly of claim 11 wherein the movable curve is biased in a direction opposite to the forward direction and when the guide pin is moved along the second curve part when the movable curve is moved in the forward direction against the spring bias, the wind deflector arm lowers from the extended higher position, and when the movable curve moves further in the forward direction the movable curve imparts the forward movement to the wind deflector arm and the wind deflector body.

15. The movable wind deflector assembly of claim 11 wherein the movable curve is biased in a direction opposite to the forward direction and when the guide pin is in the first curve part and the movable curve is moved in the forward direction against the spring bias, the wind deflector arms is raised from the retracted lower position, and when the movable curve moves further in the forward direction the movable curve imparts the forward movement to the wind deflector arm and the wind deflector body.

16. The movable wind deflector assembly of claim 15 wherein a stationary hinge pin forms the stationary hinge point which is movable along a slot on the wind deflector arm and the operating mechanism moves the wind deflector arm in a forward direction away from the hinge pin.

17. The movable wind deflector assembly of claim 16 wherein the stationary hinge pin is preloaded by a spring in the slot on the wind deflector arm.

18. The movable wind deflector assembly of claim 11 wherein the operating mechanism is configured to move the wind deflector arm and the wind deflector body away from the hinge point in a forward direction while the wind deflector arm is in an inclined position relative to the retracted position.

19. The movable wind deflector assembly of claim 14 wherein a stationary hinge pin forms the stationary hinge point which is movable along a slot on the wind deflector arm and the operating mechanism moves the wind deflector arm in a forward direction away from the hinge pin.

20. The movable wind deflector assembly of claim 19 wherein the stationary hinge pin is preloaded by a spring in the slot on the wind deflector arm.

* * * * *